UNITED STATES PATENT OFFICE.

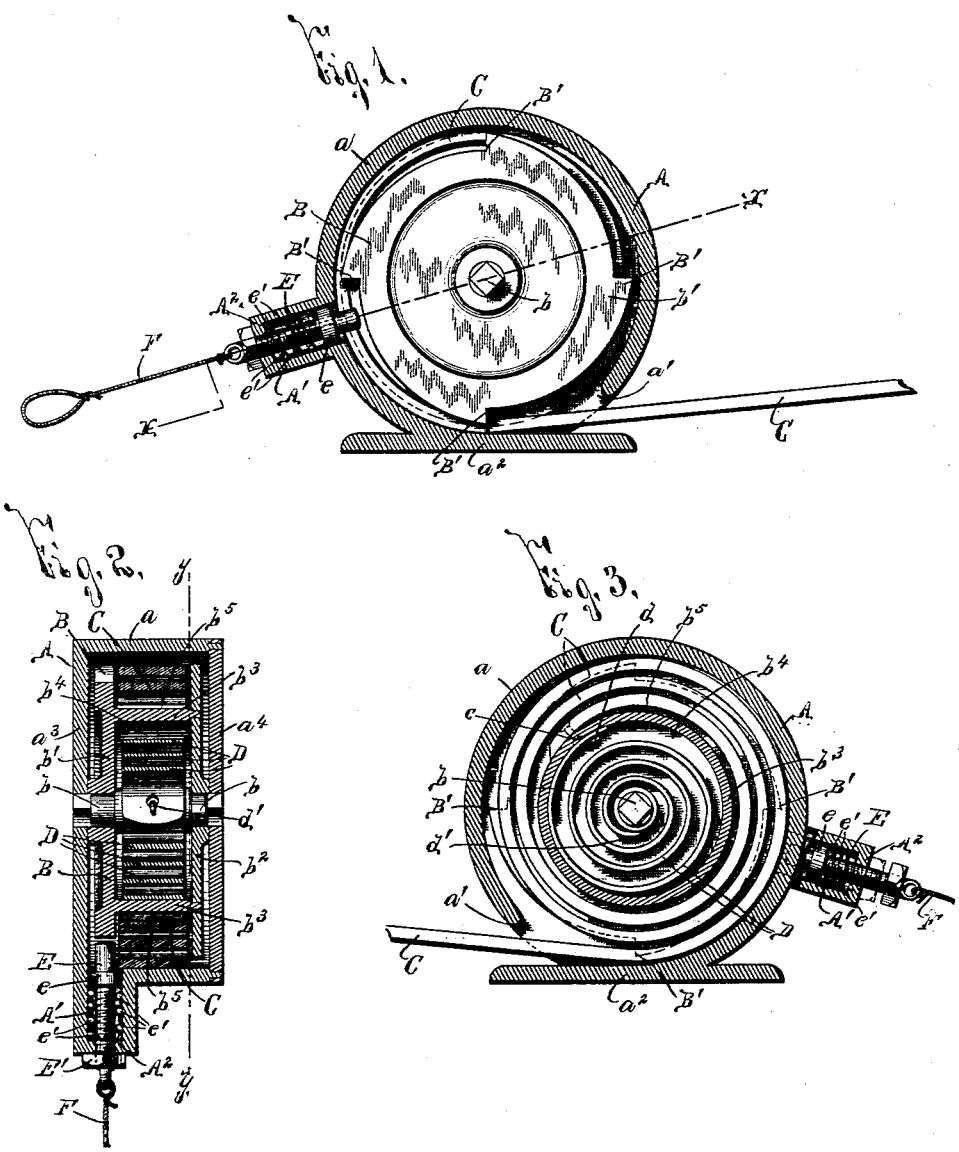

SAMUEL O. TUERK, OF FULTON, NEW YORK.

CHECKING DEVICE.

SPECIFICATION forming part of Letters Patent No. 476,333, dated June 7, 1892.

Application filed June 8, 1891. Serial No. 395,478. (No model.)

*To all whom it may concern:*

Be it known that I, SAMUEL O. TUERK, of Fulton, in the county of Oswego, in the State of New York, have invented new and useful Improvements in Checks, of which the following, taken in connection with the accompanying drawings, is a full, clear, and exact description.

My invention relates to improvements in checks for horses, and has for its object the production of a simple and effective device whereby the occupant of a carriage or other vehicle may readily check the horse or release the checkrein to permit him to drink, and thus obviate the inconvenience occasioned by the engagement and releasement of the checkrein when the ordinary check-hook is used; and to this end it consists, essentially, in an outer shell, a revoluble drum within the shell having one extremity of the checkrein secured thereto and adapted to be wound thereupon by a spring secured to said drum, and a ratchet-dog or locking-bolt for engaging teeth on said drum and holding the checkrein in its adjustment.

The invention furthermore consists in the detail construction and arrangement of the parts, all as hereinafter more particularly described, and pointed out in the claim.

In describing this invention reference is had to the accompanying drawings, forming a part of this specification, in which like letters indicate corresponding parts in all the views.

Figure 1 is a longitudinal vertical sectional view of my improved invention, the drum upon which the checkrein is wound being shown in elevation. Fig. 2 is a transverse vertical sectional view taken on line $x\ x$, Fig. 1; and Fig. 3 is a longitudinal vertical sectional view taken on line $y\ y$, Fig. 2.

It is well known that great inconvenience is at present experienced in releasing horses from the check for the purpose of permitting them to drink and then rechecking the horse, as, if the animal is restive or nervous, there is more or less liability that he may become scared and run away, and as the immediate locality of troughs and other watering places is more or less muddy the rider often becomes more or less besmeared. For the purpose of obviating these objectionable features there have been devised certain checks; but owing to their detail construction and arrangement they have been more or less open to objection and have never come into general use.

My invention is designed to obviate the present disadvantages experienced in manipulating a checkrein, and, owing to the peculiar construction and arrangement of the parts thereof, is extremely durable, practical, and efficient, and is so easily operated that there is not the slightest liability of alarming the most skittish horse.

A represents a chamber composed of an upright cylindrical shell $a$, having a slot $a'$ in its front face, a suitable attaching-foot $a^2$ at its base, and flat sides $a^3$ and $a^4$, one of which $a^4$ is removable for the purpose of entrance to the interior.

B represents a drum loosely journaled on a shaft $b$, having its opposite extremities formed of angular cross-section and mounted in corresponding openings in the plates $a^3$ and $a^4$ for preventing revolution of said shaft. The drum B preferably consists of the side walls $b'\ b^2$, upon which are projecting hubs for preventing excess of friction between the adjacent walls of the shell $a$ and the peripheral wall $b^3$, said walls being so arranged relatively that the drum is formed with an inner hollow chamber $b^4$ and with a peripheral groove $b^5$. The strap C is secured at one extremity, by suitable means $c$, to the outer face of the peripheral wall $b^3$ and is automatically wound thereupon by means of a coil-spring D, having one end secured by suitable means $d$ to the inner peripheral face of said wall $b^3$ and the other extremity secured by suitable means $d'$ to the non-revoluble shaft $b$.

E represents a locking bolt or dog movable in a chamber A' and provided with a shoulder $e$, between which and the adjacent wall A² of the chamber A' is interposed a spring $e'$. This spring constantly forces the inner extremity of said dog into engagement with ratchet-teeth B', formed in one of the side walls, as $b'$, of the drum B. Secured to the opposite extremity of the dog E is a cord F, which is engaged by the rider's hand, being passed rearwardly along the horse's back by means of loops (not illustrated) formed upon the saddle, it being understood that any suitable guide-loops can be used; but it is unnecessary to herein illustrate and describe the same. It will thus be understood upon reference to the drawings and the foregoing description that when desired to release the checkrein the rider merely engages the loop of the cord F, whereupon the horse in the natural movement of forcing his head downward to the water rotates the drum B upon its shaft and against the action of the spring D. The cord may then be released, and as the horse raises his head, either naturally or by means of force applied to the reins, the spring D winds the inner end of the checkrein upon the drum and the dog E automatically engages the ratchet-teeth B' and locks said drum in its adjusted position, thus securely checking the horse.

In order to prevent automatic locking of the check when it is desired to allow the horse free movement of his head, I provide at the outer extremity of the dog E an adjustable shoulder, as a nut E', movable upon screw-threads formed at said outer extremity. By screwing the nut E' the inner end of the dog is withdrawn from the interior of the shell a against the action of the spring e', and the drum is then free to revolve without engagement by said dog.

As is evident, the parts of my invention are simple in construction, and, with the exception of the locking-bolt, they may be formed with stamped or cast metal at a minimum cost of expense, and when assembled are effective, strong, and durable.

Having thus fully described my invention, what I claim as new, and desire to secure by Letters Patent, is—

In a checking device, the combination of an outer shell a, having an opening a', a drum revoluble within said shell and adapted to have secured thereto the inner end of the checkrein, which enters through the opening a', a spring for rotating the drum and winding the checkrein thereon, a chamber A', projecting outwardly from said shell, a bolt within the chamber A', having one end projecting beyond said chamber and the other adapted to engage the drum and prevent its revolution, a shoulder on the bolt, a spring encircling the bolt and interposed between said shoulder provided thereon and the adjacent wall of the chamber A' for engaging the bolt with the drum, and a nut E', movably mounted upon the outer end of the bolt, substantially as and for the purpose specified.

In testimony whereof I have hereunto signed my name, in the presence of two attesting witnesses, at Syracuse, in the county of Onondaga, in the State of New York, this 3d day of June, 1891.

SAMUEL O. TUERK.

Witnesses:
CLARK H. NORTON,
L. M. BAXTER.